Feb. 11, 1969  D. L. PLATUS ET AL  3,426,869
ENERGY ABSORBING ARRANGEMENT
Filed Jan. 3, 1967  Sheet 3 of 5

INVENTORS
DAVID L. PLATUS
RONALD C. GULARTE
BY
Don Finkelstein
ATTORNEY

INVENTORS
DAVID L. PLATUS
RONALD C. GULARTE
BY
Don Finkelstein
ATTORNEY

United States Patent Office 3,426,869
Patented Feb. 11, 1969

3,426,869
ENERGY ABSORBING ARRANGEMENT
David L. Platus, Covina, and Ronald C. Gularte, Los Angeles, Calif., assignors to Mechanics Research, Inc., a corporation of California
Filed Jan. 3, 1967, Ser. No. 606,633
U.S. Cl. 188—1                      19 Claims
Int. Cl. F16f 7/12; F16d 61/00; B60t 7/12

ABSTRACT OF THE DISCLOSURE

A resettable energy absorbing arrangement as disclosed herein. In some of the embodiments energy is absorbed by the cyclic plastic deformation of ductible metal members by providing relative motion between two means that cyclically deform the ductile metal members. A slip clutch and a drive means are also provided so that energy will be absorbed for movement of the slip clutch in one direction to allow comparatively free movement back to the original position after the energy absorbing stroke. A return means is also included so that the drive means is returned to the initial condition after each energy absorbing cycle.

---

This invention relates to the energy absorbing art and more particularly to an improved energy absorbing structure capable of energy absorbing repetitive operations that is in condition to provide the energy absorbing function after each energy absorbing cycle.

In many energy absorbing applications, desirably, the energy absorbing device should have the capability of being reset to its initial or other energy absorbing position without a substantial utilization of energy or large restoring forces after each repetition of the energy absorbing function.

Crushable tubes or other crushable materials and similar "one-shot" devices are generally not capable of repeated use. Springs, on the other hand, while capable of repeated use, are generally of an energy storing and returning nature and do not, in the strict sense, absorb an appreciable amount of energy. However, springs in general can be used repetitively but their energy absorption is quite low particularly when compared with the "one-shot" devices on a basis of energy absorption per unit weight or volume of material associated with the spring.

Various fluid transfer or extrusion devices, such as hydraulic shock absorbers, dash pots, extrudable metal devices, and the like, generally do not have a high energy absorption per unit weight or volume. However, they can, in many instances, be used repetitively.

Various cyclic plastic deformation energy absorbing devices, such as those employing rolling toroidal elements have comparatively high energy absorption characteristics per unit weight or volume but in general such devices have been uni-directional in nature. That is, they are adapted to absorb energy only when the force is applied to the device in a first direction along the axis of the toroidal elements and then in a second direction opposite the first direction along the axis of the toroidal elements. Such devices have not, therefore, been resettable without either expending equivalent amount of energy in restoring the device to its initial position or disassembling the device to restore it to its initial condition.

Consequently, there has long been a need for a comparatively light weight, high energy absorption device that is capable of repeated operations and which is always in a condition capable of performing its energy absorbing function after each repetition of energy absorption.

Accordingly, it is an object of applicants' invention herein to provide an improved energy absorbing arrangement.

It is another object of applicants' invention herein to provide an energy absorbing arrangement in which the energy absorbing device may be utilized repetitively.

It is yet another object of applicants' invention herein to provide a repetitively operable energy absorbing device that is automatically reset to an energy absorbing condition after each cycle of energy absorption.

The above and other objects are achieved, according to one embodiment of applicants' invention, by providing energy absorption through the cyclic plastic deformation of a plurality of laterally compressed tube members, that is, the tube members are compressed along a diameter thereof.

In this embodiment, there is provided a substantially cylindrical rod-like inner drum member enclosed within a cylindrical tube-like outer drum member. The inner wall of the outer drum member is spaced a preselected distance from the outer wall of the inner drum member. A plurality of deformable tube members are constrained within the annular space between the inner wall of the outer drum member and the outer wall of the inner-drum member. The diameter of the tube members is, in the unstressed condition, greater than the width of the annular space between the inner drum member and the outer drum member. Therefore, the tube members are subjected to lateral compressive forces and deformation when they are constrained between the inner drum member and the outer drum member. The axis of the tube members is substantially parallel to the axis of the inner-drum member and the tube-like member, and the tube members are, in the preferred embodiment of applicants' invention laterally compressed so as to produce a deformation in the plastic deformation region of stress and strain levels.

A slip clutch, which in this embodiment is of the class called a ratchet-type clutch is coupled to, for example, the inner-drum member and allows relative rotary motion of the inner-drum member with respect to the outer-drum member. It will be appreciated that as this relative rotary motion between the inner-drum member and the outer-drum member takes place, the plurality of tube members are caused to rotate about their own axis because of the friction produced by the lateral compressions. This rotation of the tube members causes cyclic plastic deformation of the tube members which absorbs the energy that, for example, may be applied to drive the ratchet clutch.

In this embodiment of applicants' invention a rack means drivingly engages the ratchet clutch and is adapted to rotate the ratchet clutch in a first direction from a first position to a second position and in so doing drive the ratchet clutch to drive the inner-drum member in the relative rotary motion between the inner-drum member and the outer-drum member. Thus, in movement of the rack means in the first direction from the first position to the second position there is energy absorption by the above mentioned rotation of the tube members.

However, the ratchet clutch is designed to be freely rotating with respect to the inner-drum member for rotation in the opposite direction. Consequently, a comparatively light spring means which resiliently resists movement of the rack means in the first direction may be utilized to restore the rack means to the first position from the second position without the substantial expenditure of energy. Thus, in this embodiment of applicants' invention, energy is absorbed during each cycle of movement of the rack means from the first position to the second position and the energy absorbing device is automatically restored, by, for example, the spring means, to the first position after each cycle of energy absorption.

In other embodiments of applicants' invention, energy absorption means, such as radially compressed helix members, are constrained between the inner-drum member and the outer-drum member and absorb energy by the rotation of the helix members about their axis.

In other arrangements the inner wall of an outer-drum member frictionally engages the outer wall of an inner-drum member and the friction therebetween absorbs energy.

In other embodiments o fapplicants' invention various chain and sprocket arrangements, cable-driven drums, levers and the like, may be utilized for the drive mechanism to drive a slip clutch.

As utilized herein, applicants' slip clutch is defined to means any form of clutch providing transmission of driving forces in a first direction and being comparatively freely moveable in a second direction.

The above and other embodiments of applicants' invention may be more clearly understood from the following detailed description taken together with the accompanying drawing wherein similar reference characters refer to similar elements throughout and in which.

As noted above, applicants' improved energy absorbing arrangement absorbs energy by the cyclic deformation of a material which exhibits hysteretic stress-strain behavior. Such energy absorbtion may be by the cyclic plastic deformation of a ductile metal.

In other embodiments of applicants' invention various metal utilized as the energy absorbing medium is in the form of rolling tubes laterally compressed. The tubes are strained well beyond their yield point and the relative motion of the members providing the lateral compression produces cyclic plastic bending deformation of the tubes, thereby generating a substantially constant resisting force. Applicants prefer tubes as the design configuration for the energy absorbing medium in this one embodiment since variations in both diameter and wall thickness of the tubes allows a high degree of design flexibility for providing both high and low energy absorption characteristics in small or large spaces, as may be required. Thus, in applications such as impact attenuation, shock isolation, earthquake and blast resistant structures, various mechanical fuse applications, and the like, the energy absorbing characteristics of the laterally compressed rolling tubes provides the desired energy absorption for the application.

In the cyclic plastic straining of a ductile metal at a fixed strained range there is produced a hysteresis loop which stabilizes during the first few cycles. Repeated cycling results in almost constant energy absorption per cycle until eventual fatigue failure. Since the plastic strain fatigue behavior of ductile metals generally follows a simple power law relating plastic strain range, which may be considered the width of the hysteresis loop, and fatigue life, the design characteristics combining the type of metal utilized for the tube members and the diameter of the tube members, the wall thickness of the tube members, and the amount of lateral compression imposed thereon, can provide variations in both the energy absorption characteristics as well as the length of life of the working elements until failure. That is, the narrower the hysteresis loop, which implies the less energy absorbed per cycle, the greater will be the cycles to failure and consequently the greater the total energy absorption of the device until failure of the working elements.

In the embodiments of applicants' invention described below the above principles are uniquely utilized to provide not only an energy absorbing device but one which is always reset to an energy absorbing condition after the application of an energy absorption cycle. That is, prior devices have often been limited, particularly where unidirectional forces are applied to absorb the energy, to a predetermined stroke length before the unit must either be disassembled and reset to its initial condition or the driving member must be disengaged from the energy absorption unit and re-engaged in its initial position. Thus, in many applications, such as automobile bumpers, elevator protection devices, and the like, where repeated applications of unidirectional forces are encountered, there must be provided a means in which not only is the energy desired absorbed, but after each repetition of energy absorption the unit is reset to its initial condition, or in another energy absorbing condition, so that energy absorption may commence again.

The various drive mechanisms illustrated in the following embodiments of applicants' invention as well as the various energy absorption structures illustrated herein may be interchanged as required by design considerations. That is, the drive slip clutch and reset mechanisms illustrated in the various embodiments of applicant's invention may equally well be interchanged with the various energy absorption devices illustrated to provide a greater degree of design flexibility.

Figure 1:
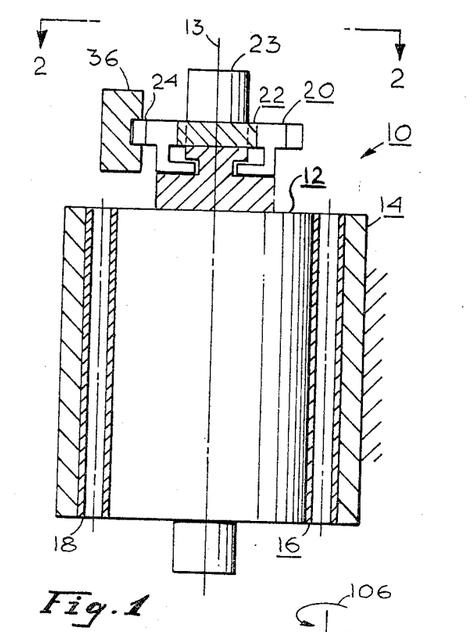
FIGURES 1 and 2 illustrate one embodiment of applicants' invention.
Figures 2, 3:
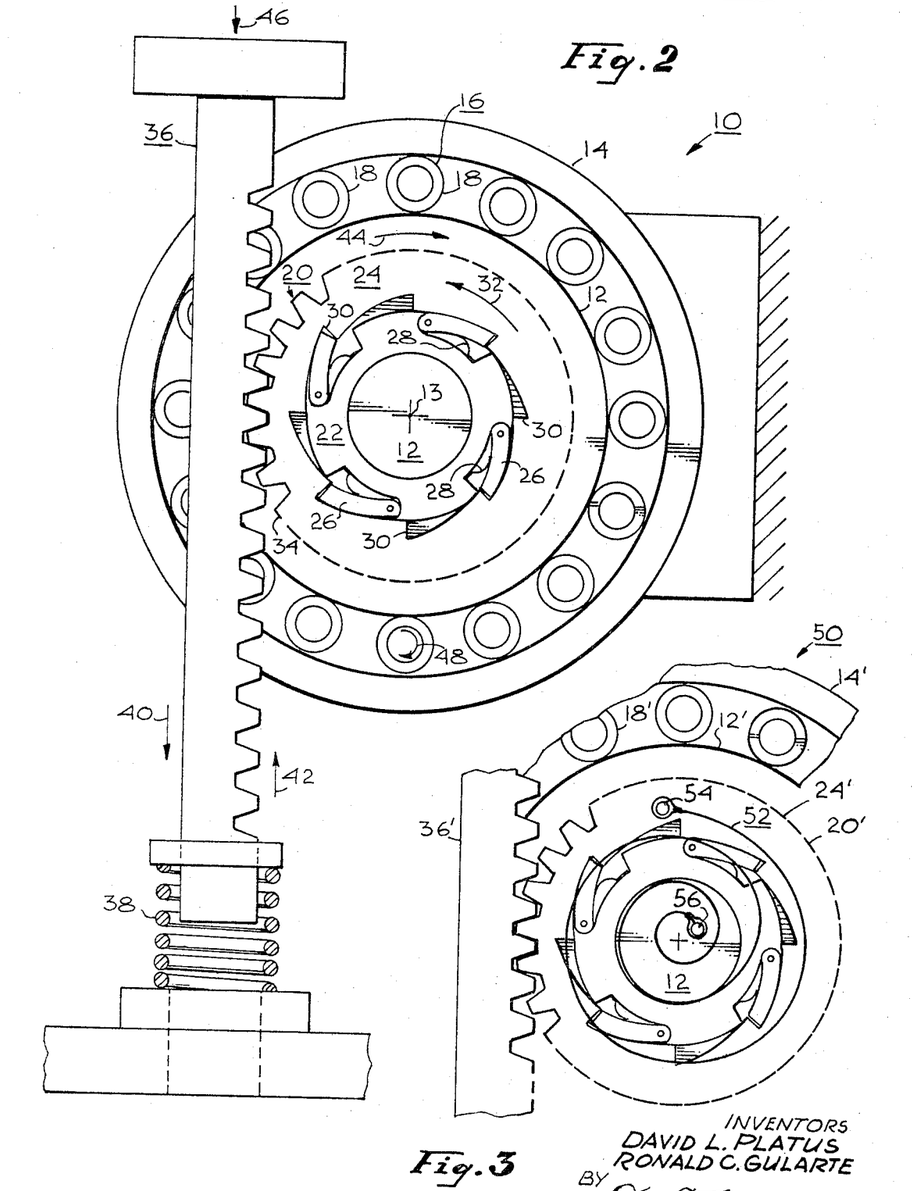
FIGURE 3 illustrates another embodiment of applicants' invention.

Referring now to FIGURES 1 and 2, there is shown one embodiment of applicants' invention, generally designated 10, of an improved resettable energy absorption device. As shown on FIGURE 10 there is provided a first body member 12, which, in this embodiment of applicants' invention, is in the form of a rod-like inner-drum member. A second body member 14, which in this embodiment of applicants' invention is in the form of a tube-like outer-drum member, surrounds the inner-drum member 12 and is spaced a pre-selected distance therefrom.

Energy absorbing means 16 such as the plurality of ductile metal tubes 18 are constrained between the inner-drum member 12 and outer-drum member 14. The tube members 18 have a diameter, in the unstrained condition, that is greater than the annular spacing between the inner-drum member 12 and the outer-drum member 14 so that the tube members 18 are subjected to a predetermined amount of laterally directed compression when they are constrained between the inner-drum member 12 and the outer-drum member 14.

A drive means 20 is drivingly coupled to a first end 23 of the inner-drum member 12. The outer-drum member 14 is, in this embodiment of applicants' invention, fixed and the inner-drum member 12 moves relative thereto. Thus, the inner-drum member 12 rotates about its axis 13 relative to the outer-drum member 14.

The drive member 20, in this embodiment of applicants' invention, comprises a ratchet-type slip clutch 22 driven by a gear means 24. The ratchet clutch 22 has a plurality of pivotally mounted fingers 26 that are spring loaded by, for example, leaf springs 28 in the radially outward direction. The finger-like members 26 are adapted to engage the teeth 30 of the gear means 24 for a driving engagement therewith when the gear means 24 is rotated in the direction of the arrow 32.

The gear means 24 is also provided gear teeth 34 that engage corresponding teeth in rack means 36. Rack means 36 is provided with a spring means 38 that resiliently resists motion of rack means 36 in the direction indicated by the arrow 40, and, as described below in greater detail, moves rack means 36 in the direction indicated by the arrow 42 after movement of the rack means 36 in the direction indicated by the arrow 40.

It will be appreciated that the ratchet-type slip clutch 22 shown as forming a part of drive means 20 in this embodiment of applicants' invention provides a driving engagement for movement of the rack means 36 in the direction indicated by the arrow 40 to rotate the ratchet and the clutch 22 in the direction indicated by the arrow 32 and thereby rotate the inner-drum member 12 in the direction indicated by the arrow 32. However, rotation of the gear means 24 in the direction indicated by the arrow 44 does not drive the ratchet clutch 22 and consequently is comparatively freely moving in this direction.

When energy is to be absorbed a force is applied on the rack means 36 in the direction indicated by the arrow 46. This force moves the rack means 36 in the direction indicated by the arrow 40 and rotates the ratchet clutch 22 and inner-drum member 12 in the direction indicated by the arrow 32. Rotation of the inner-drum member 12 in the direction indicated by the arrow 32 rotates the plurality of tube members 18 in the direction indicated by the arrow 48. Since the plurality of tube members 18 are undergoing cyclic plastic deformation during each revolution about their own axis, energy from the force 46 moving through a pre-selected stroke distance is thereby absorbed. The outer-drum member 14 is, in this embodiment of applicants' invention, fixed. Consequently, the continual rotation of the tube members 18 about their own axis absorbs energy in the manner described above. When the force 46 terminates movement of the rack means 36 and is removed, the spring 38 restores the rack means 36 to its first position. Since the ratchet-type slip clutch 22 is not rotated by the gear means 24 for movement of the rack means 36 from its second position, at the end of the energy absorbing stroke, back to its first position, substantially no energy is associated with this movement and the rack means 36 is thus restored to its initial position. Therefore, the energy absorbing device 10 illustrated in this embodiment of applicants' invention is continuously ready to absorb energy for repeated applications of unidirectional forces applied thereon.

As noted above, the spring means 38 shown in FIGURE 2, provides the restoring force necessary to reset the energy absorbing device 10 to its initial energy absorbing condition. However, in some applications of applicants' invention, it may be desirable to have other means for restoring the energy absorbing device to its initial condition. One such arrangement is illustrated in FIGURE 3.

As shown on FIGURE 3, there is an energy absorbing device 50 which, in general, is substantially identical to the energy absorbing device 10 shown on FIGURES 1 and 2. However, in the energy absorbing device 50 there is provided a coil spring 52 having a first end 54 coupled to gear means 24' of a ratchet-type slip clutch 22' and a second end 56 fixed. Thus the rackmeans 36' rotates the means 24, to drivingly rotate inner-drum member 12' in one direction and the spring means 52 restores the rack member 36' and the gear means 24' to its first or initial position after the application of the force from which energy is to be absorbed. Thus, the coil spring 52 provides the same function as the spring 38 on FIGURES 1 and 2.

Figure 4:
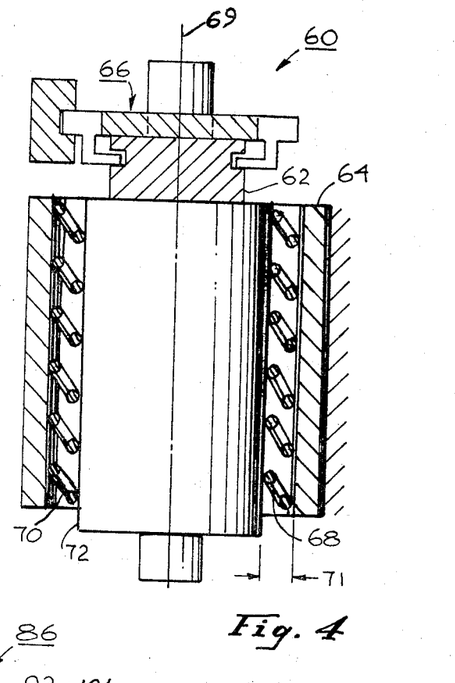
FIGURE 4 illustrates another embodiment of applicants' invention.

While applicants prefer to use tube members for certain applications of their invention, in other applications applicants have found it is desirable to utilize structural configurations other than tube members for the energy absorption medium in applicants' energy absorbing arrangement. FIGURE 4 illustrates one such embodiment of applicants' invention in which a unit other than a tube member is utilized as the energy absorption structure.

As shown on FIGURE 4 there is an energy absorption arrangement generally designated 60 which is similar to the energy absorption arrangement 10 described above. The energy absorption arrangement 60 is provided with an inner-drum member 62 in the form of a substantially rod-like member and a concentrically mounted tube-like outer-drum member 64. A drive means 66 is drivingly coupled to the inner-drum 62 and the outer-drum member 64 is correspondingly fixed to allow relative rotary motion between the inner-drum member 62 and the outer-drum member 64.

The drive means 66 coupled to the inner drum member 62 is identical to the drive means 20 described above in connection with FIGURES 1 and 2.

In this embodiment of applicants' invention there is provided a plurality of energy absorbing members 68 which, as shown on FIGURE 4, are in the form of a plurality of ductile metal helix members. The long axis of the helix members 68 is aligned substantially parallel to and colinear with the axis 69 of the inner-drum member 62 and outer-drum member 64. The helix members 68 have a normal helix diameter 71 greater than the annular spacing between the inner wall 70 of the outer-drum member 64 and the outer wall 72 of the inner-drum member 62. Therefore, the helix members 68 are subjected to a lateral compression when positioned between the inner-drum member 62 and outer-drum member 64 shown on FIGURE 4. The lateral compression applied to the helix members 68 produces plastic deformation of the material utilized in the helix members 68 and consequently, because of the friction resulting from the lateral compression, relative rotary motion between the rotating inner-drum member 62 and the fixed outer-drum 64 rotates the helix members 68 about their internal axis and provides energy absorption during each rotation thereof. It will be appreciated, of course, that the drive means 66 could equally well be connected to the outer-drum member 64 and the inner-drum member 62 could be fixed.

As noted above, applicant has described the embodiments of his invention in which energy is absorbed by the cyclic plastic deformation of ductile materials. Thus, in the embodiment shown in FIGURES 1, 2, and 3 the cyclic plastic deformation of ductile metal tube members provides the energy absorption while in the embodiment shown in FIGURE 4 the cyclic plastic deformation of ductile metal helix members provided energy absorption. However, in the concept of resettable energy absorption devices, applicant is not limited to utilization of cyclic plastic deformation as the energy absorption characteristic.

Figure 5:
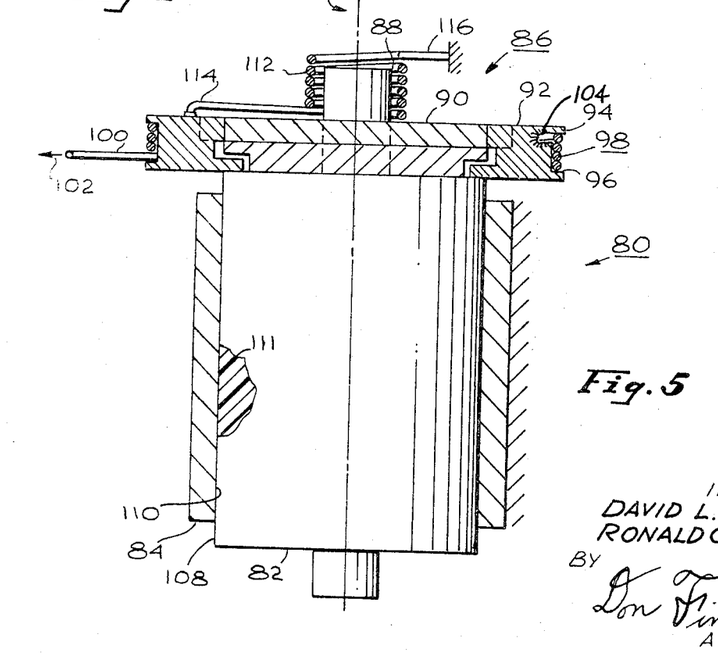
FIGURE 5 illustrates another embodiment of applicants' invention.

FIGURE 5 illustrates another embodiment of applicants' invention in which there is no cyclic plastic deformation of a material to absorb energy. As shown on FIGURE 5 there is an energy absorption arrangement generally designated 80 which is provided with a first body member 82 in the form of an inner-drum member and an outer-drum member 84 in the form of a concentrically mounted tube-like member. The outer-drum member 84 is fixed to allow relative rotary motion of the inner-drum member 82.

A drive means 86 is coupled to an upper end 88 of the inner-drum member 82 and the drive arrangement 86 is substantially similar to the drive arrangement 20 described above. That is, there is provided a ratchet-type slip clutch 90 and a gear means 92. However, in this embodiment of applicants' invention, the external periphery 94 of the gear means 92 is not provided with teeth but is provided with a cable storage area 96 in which there is stored a cable 98 wrapped a pre-selected number of times therearound and having an end 100 free. The force from which energy is to be absorbed is applied in the direction indicated by the arrow 102 on the end 100 of the cable 98. The other end 104 of the cable 98 is fixed to the gear means 92 and, consequently, unrolling of the cable 98 by the application of a force in the direction indicated by the arrow 102 rotates the gear means 92 in the direction indicated by the arrow 106. This drivingly engages the ratchet-type clutch 90 to drive the rod-like member 82 in the direction indicated by the arrow 106.

In this embodiment of applicants' invention the outer wall 108 of the inner-drum member 82 frictionally engages the inner wall 110 of the outer-drum member 84 with a predetermined interference fit therebetween. Thus, rotation of the inner-drum member 82 in the direction indicated by the arrow 106 provides frictional engagement between the wall 108 and the wall 110 and energy is absorbed during such rotation.

A rotary spring 112 has a first end 114 coupled to the gear means 92 and a second end 116 fixed. The rotary spring 112 resiliently resists rotation of the gear means 92 in the direction indicated by the arrow 106 and applies a restoring torque thereto when the force indicated by the arrow 102 is terminated, to restore the gear means 92 from the second position at the end of the energy absorption cycle, rewind the cable 98 on the gear means 92, and return to the first position thereof. Thus, in this embodiment of applicants' invention the energy absorbing member is comprised of the outer wall 108 of the inner-drum member 82 and energy is absorbed by the frictional engagement therebetween during relative rotary motion of the rod-like member 82 with respect to the tube-like member 84. It will be appreciated that, if desired, brake shoe material 111, illustrated in fragment section on FIGURE 5, could be inserted between the inner-drum 82 and outer-drum 84 to increase energy absorption rates.

In the embodiments of applicants' invention described above the energy absorption has occurred because of relative rotary motion of two substantially concentrically mounted members. However, in other embodiments of applicants' invention, energy may be absorbed because of relative rotating plate means. One such arrangement of applicants' invention is illustrated in FIGURE 6.

Figures 6, 7, 10:
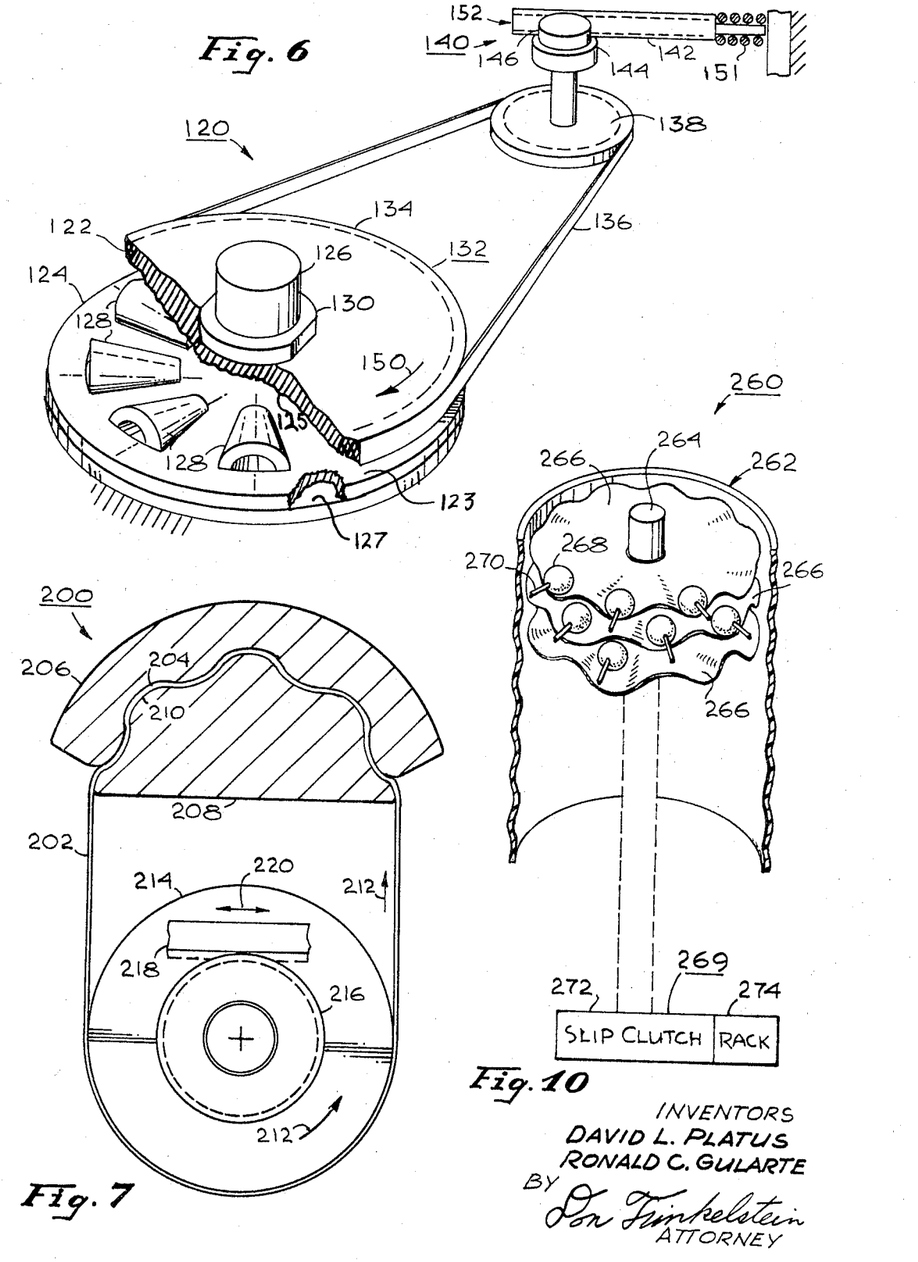
FIGURE 6 illustrates another embodiment of applicants' invention.
FIGURE 7 illustrates another embodiment of applicants' invention.
FIGURE 10 illustrates another embodiment of applicants' invention.

As shown in FIGURE 6, there is an energy absorbing arrangement generally designated 120. The energy absorbing arrangement 120 is comprised of an upper plate 122 which, in this embodiment of applicants' invention, is in the form of a plate or disc spaced apart from a lower plate 124 which, in this embodiment of applicants' invention, is also in the form of a plate or disc. The lower plate 124 is provided with a threaded cylindrical projection 126 protruding through the upper plate 122.

A plurality of conical or tapered tube members 128 are positioned between the upper plate 122 and the lower plate 124 and the axes of the conical tube members 128 are radially aligned with the upper and lower plates 122 and 124 and a separator means 123 is positioned between the conical shaped lower surface 125 of the upper plate 122 and the conical shaped upper surface 127 of the lower plate 124 to maintain the spatial separation of the tube members 128. The conical shaped surfaces 125 and 127 of the upper and lower plates 122 and 124 respectively provide contact with the tube members 128 along the length thereof.

A nut 130 threadingly engages the cylindrical projection 126 and clamps the upper plate 122 toward the lower plate 124 to apply a predetermined lateral compression to the conical tube members 128. As noted above, the amount of compression applied to the conical tube members 128 is sufficient to strain the tube members 128 beyond the yield point thereof.

The outer periphery 132 of the upper plate 122 is provided with tooth members 134 that engage a chain means 136. The chain means 136 also engages a sprocket means 138 and is driven thereby. The sprocket means 138 is provided with a drive means 140 which is identical to the drive means 20 described above and, as such, comprises a rack means 142 engaging a gear means 144 that drives a ratchet type slip clutch 146 to rotate the sprocket 138 and consequently drive the chain means 136 and the upper plate 122 in the direction indicated by the arrow 150 upon application of a force to the rack means 142 in the direction indicated by the arrow 152.

The lower plate 124 is fixed in this embodiment of applicants' invention.

As noted above, the drive means 140 uniquely returns to its first position after the application of the force indicated by the arrow 152 under the influence of spring means 151 and is consequently continuously ready to repeat the energy absorbing function. Energy is absorbed by the rolling conical tube means 128 due to the cyclic plastic straining thereof during the relative rotary motion.

Applicants' invention of an improved resettable energy-absorbing arrangement may also be practiced in a structure wherein the energy-absorbing medium is in the form of a band or tape. FIGURE 7 illustrates one embodiment of an energy-absorbing arrangement according to applicants' invention herein wherein cyclic plastic deformation of a ductile metal wire or tape is utilized repetitively to absorb energy.

As shown on FIGURE 7, there is an energy-absorbing arrangement generally designated 200 having a flexible ductile metal band 202 positioned in a passageway 204 defined by an upper jaw 206 and a lower jaw 208. The passageway 204 is a reverse curve passageway and as the band 202 is moved through the passageway 204 there is a cyclic plastic deformation thereof as the band is forced into the reverse curves by the projections 210.

In this embodiment of applicants' invention the upper jaw 206 and lower jaw 208 are fixed and the band 202 moves through the passageway 204 as it may be driven in a direction indicated by the arrow 212 by the friction roller means 214. Thus, the means 214 engages the band 202 to provide the force for pulling the band 202 through the passage 204. The means 214 may, of course, have gear teeth (not shown) or it may be a frictional engagement, as shown, between the outer periphery thereof at the band means 202.

A slip clutch 216, which may be similar to the slip clutches defined above, is driven by a rack means 218. The rack means 218 may be limited in travel so that energy-absorption may be provided by predetermined limited movement of the rack means 218 in the directions indicated above by the double arrow 220. The rack means 218 may be returned to a first position, after each energy-absorbing cycle, by a spring return means, or similar return means (not shown), as described above. In any event, the movement of the rack means 218 in either direction depending on the clutch 216, indicated by the arrow 220 can provide energy-absorption through the cyclic plastic deformation of the band means 202.

It will be appreciated, of course, that the particular form and shape of the passageway 204 may be varied to determine the amount of energy that will be absorbed by the band 202 during predetermined movement thereof. Further, it will be appreciated, the band means 202 may have any cross-sectional area and shape as desired. That is, the cross-sectional shape may be circular, rectangular, trapezoidal, or any other desired geometric figure.

In other embodiments of applicants' invention the energy-absorbing medium of an energy-absorbing device according to applicants' invention herein may be in the form of a ductile metal cylinder that is driven in a curve-reversing passageway to provide cyclic plastic deformation of the cylinder during movement through the passageway. Such an arrangement of applicants' invention is shown on FIGURES 8 and 9. It will be appreciated, of course, that in FIGURES 8 and 9 the energy-absorbing cylinder is driven and the outer drum and inner drum are stationary with respect thereto.

Figure 8:
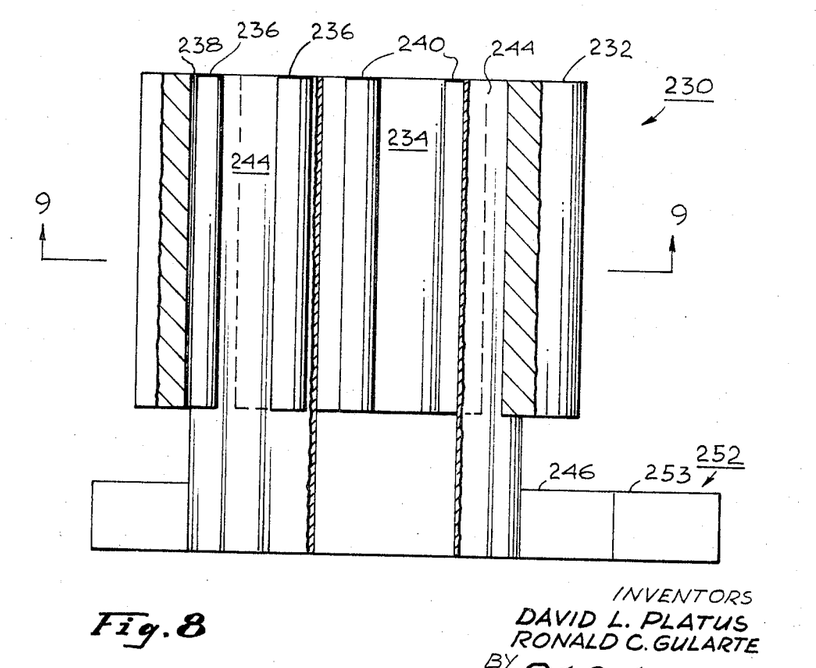
FIGURES 8 and 9 illustrate another embodiment of applicants' invention.
Figure 9:
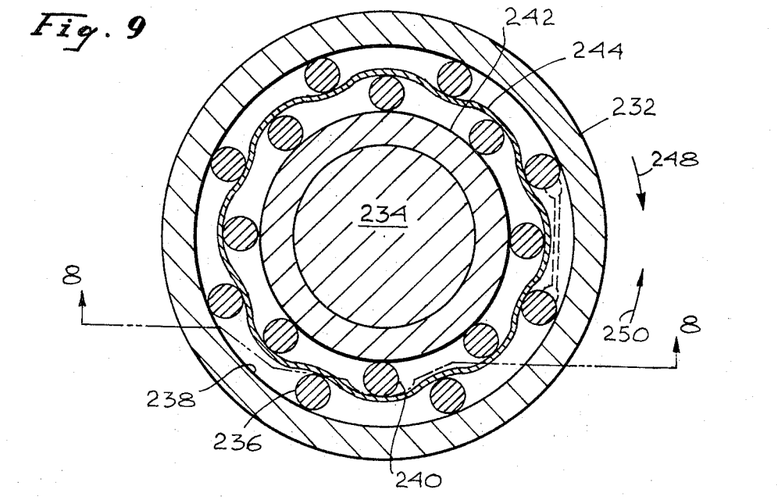

As shown on FIGURES 8 and 9, there is an energy-absorbing arrangement generally designated 230 comprised of a fixed outer drum 232 and a fixed inner drum 234. A first plurality of cylindrical rollers 236 are in contact with the inner surface 238 of the tube-like outer drum 232. A second plurality of rollers 240 are in contact with the outer peripheral surface 242 of the rod-like inner drum 234. The first plurality of cylindrical members 236 are adapted to roll along the inner wall 238 of the outer drum 232 and the second plurality of cylindrical members 240 are adapted to roll along the outer peripheral wall 242 of the inner drum 234.

The diameter of each of the rollers 240 and 236 are greater than one-half of the spacing between the outer wall 242 of the inner drum 234 and the inner wall 238 of the outer drum 232.

A ductile metal cylindrical energy-absorbing member 244 is positioned between the first plurality of rollers 236 and second plurality of rollers 240 and, since the diameters of the rollers 236 and 240 are each greater than the distance between the cylinder 244 and either the inner drum 234 or the outer drum 232, the energy-absorbing cylinder 244 is forced into a plurality of reverse curves similar to the reverse curves shown in the passageway 204 of the embodiment shown on FIGURE 7.

A slip clutch 246 which, for example, may be a ratchet type clutch similar to the ratchet clutches described above, is drivingly coupled to the energy-absorbing cylinder 244 and is adapted to drivingly rotate the cylinder 244 in a first direction as indicated by the arrow 248 and to slip and be free of driving engagement with the energy absorbing cylinder 244 for rotation in the opposite direction indicated by the arrow 250.

The drive means 252 may, for example, comprise the ratchet-type slip clutch 246 and the rack 253, similar to the drive described above, returned to its initial position after each energy-absorbing movement thereof by a return spring (not shown). Thus, for movement of the rack 253 to drive the clutch 246 in a direction indicated by the arrow 248, the energy-absorbing cylinder 244 is forced into the reverse curve path defined by the first plurality of cylindrical rollers 236 and the second plurality of cylindrical rollers 240. Thus, during such movement of the energy-absorbing cylinder 244 in the direction indicated by the arrow 248 there is the cyclic plastic deformation thereof to provide energy absorption. The slip clutch 246 allows free return movement of the rack 253 after each energy absorbing cycle.

In addition to a tape or band as shown in FIGURE 7 for an energy-absorbing medium or a cylinder as shown in FIGURES 8 and 9 for an energy-absorbing medium, the energy-absorbing medium may also take the form of a washer-like structure that is forced into a curve reversing passage. Such an embodiment of applicants' invention is illustrated in FIGURE 10.

As shown on FIGURE 10, there is an energy-absorbing arrangement, generally designated 260, comprised of a tube-like outer drum member 262 and a rod-like inner drum member 264. A plurality of ductile metal discs 266 are coupled to, in this embodiment of applicants' invention, the inner drum member 264 and are adapted to rotate therewith. A plurality of spherical bearings 268 are adapted to rotate on axle means 270, which are, in turn, connected to the outer drum 262. The spherical bearings 268 are arranged in a predetermined pattern to provide a curve reversing passageway for the ductile metal discs 266 therebetween.

In this embodiment of applicants' invention shown on FIGURE 10 there is provided relative motion between the ductile metal discs 266 and the spherical bearings 268 that roll thereon. Thus, either the outer drum 262 or the inner drum 264 may be fixed and the other member may be the driven member. In the embodiment shown on FIGURE 10 the outer drum 262 may be considered as fixed and the inner drum 264 may be rotated to provide the relative motion of the energy absorbing ductile metal discs 266 in the curve reversing path provided by the particular spacing of the spherical bearings 268.

To achieve this motion there is provided a drive means 269 comprising a slip clutch 272 which, for example, may be a ratchet clutch similar to that described above, driven by a rack means 274. A return means (not shown) may also be provided to return the rack 274 to its initial condition after each energy-absorbing cycle. Thus, for rotation of the energy-absorbing disc members 266 between the spherical bearings 268 energy is absorbed therein due to the cyclic plastic deformation provided by the continually bending and curve reversing passage thereof.

It will be appreciated that roller bearings or tapered roller bearings or rigid post-like members may also be used in place of the spherical bearings 268 shown on FIGURE 10 to provide the curve reversing passage for the energy-absorbing discs 266.

Figures 11, 12, 13:
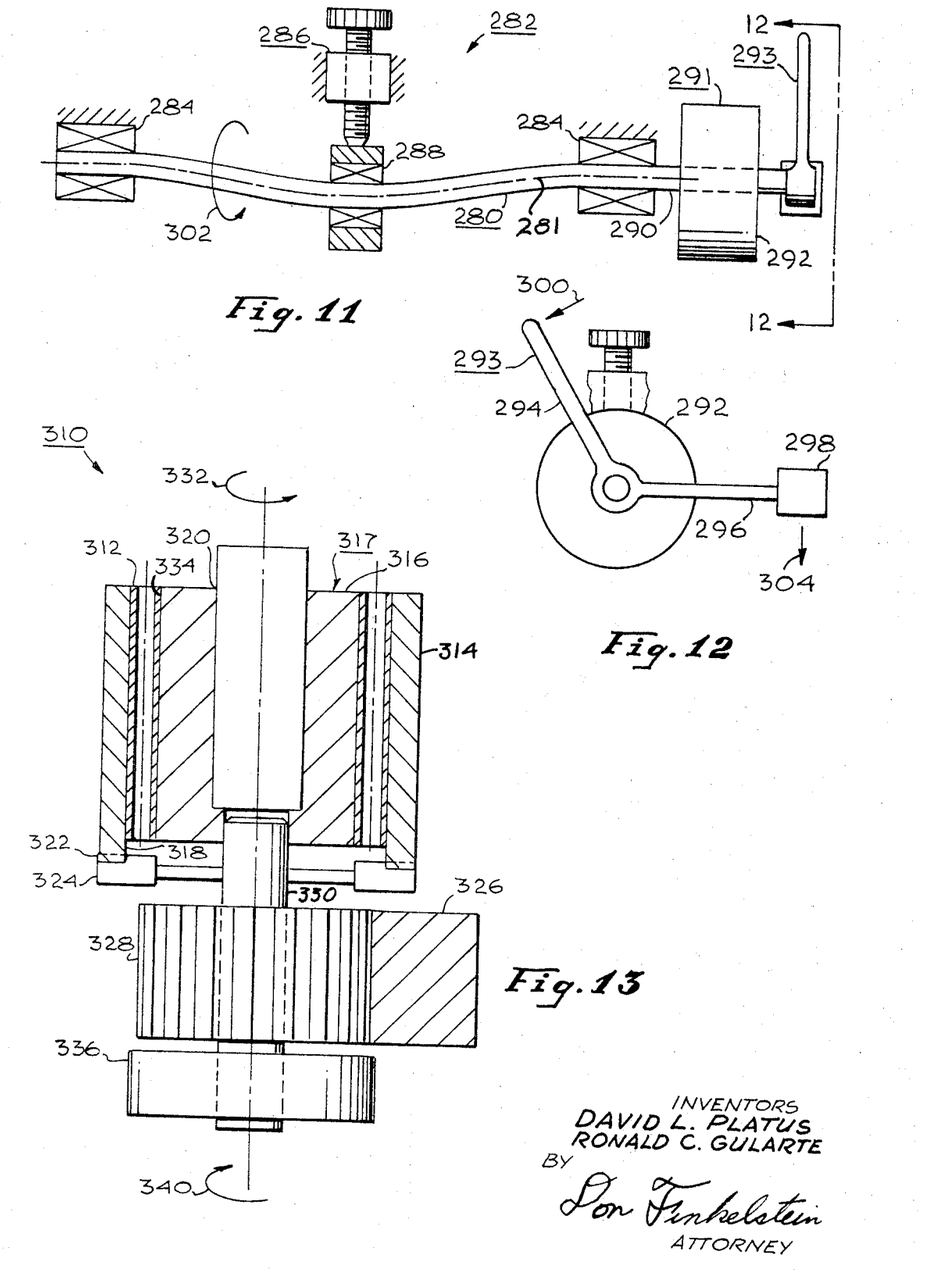
FIGURES 11 and 12 illustrate another embodiment of applicants' invention.
FIGURE 13 illustrates another embodiment of applicants' invention.

In another embodiment of applicants' invention, as shown on FIGURES 11 and 12, there is provided cyclic plastic deformation of a rod-like beam member 280 in an energy-absorbing arrangement generally designated 282. The rod-like beam member 280 is rotatably supported in spaced apart bearings 284 and a jack-screw means 286 is positioned to deflect the beam 280 from the aligned position of the fixed bearings 284 to provide a predetermined deflection. The jack-screw means 286 supports the beam 280 in bearings 288 to allow rotation of the beam 280 about the center line 281 thereof. Thus, for example, the beam 280 may be cylindrical in cross-section.

The beam 280 has an end 290 coupled to a drive means 291 comprising a slip-clutch 292, which may be similar to the slip-clutches described above, to which is connected a lever-type means 293.

As shown more clearly in FIGURE 12, the lever-type means 293 is comprised of a first arm 294 and a second arm 296 upon which is mounted a counterweight 298. When a force is applied in the direction indicated by the arrow 300 to the arm 294, the ductile metal beam 280 is rotated about the center line 281 thereof and energy is absorbed by the cyclic plastic deformation of the ductile metal beam 280 as it is rotated thereby in a direction indicated by the arrow 302. Of course, the weight 298 is raised upwardly against the force of gravity during such rotation. Therefore, when the force indicated by the arrow 300 is terminated, the weight 298 is acted on by the force of gravity in the direction indicated by the arrow 304 and the slip-clutch allows the rotation thereof back to the original position as shown on FIGURE 12 wherein the energy-absorbing device 282 is reset and is in condition to provide a repetitive and energy-absorbing function.

Some of the various components defined in the embodiments of applicants' invention may be combined so that there is a more compact structural arrangement provided. One such arrangement of an energy-absorbing device utilizing rolling ductile metal tubes to absorb energy is illustrated in FIGURE 13.

As shown in FIGURE 13, there is an energy-absorbin arrangement generally designated 310 provided with a plurality of ductile metal tubes 312 that are laterally compressed between a tube-like outer drum member 314 and the outer portion 316 of a slip clutch 317. Thus, as described above, the normal diameter of the ductile member tube 312 is greater than the spacing between the inner wall 318 of the outer drum 314 and the outer portion 316 of the clutch 317. The outer portion 316 of the clutch 317 is mounted upon the inner portion 320 thereof that is fixed relative thereto.

A first end 322 of the outer drum 314 is provided with gear teeth that are adapted to engage a gear means 324 and be driven thereby.

A rack 326 engaging a gear means 328 that is coupled to a shaft 330 to which the gear 324 is coupled provides the driving force for rotating the outer drum 314 and thereby rolling the ductile metal tubes 312 on the outer portion 316 of the clutch 317. Thus, the outer portion 316 of the clutch 317 engages and is restrained from rotation by the inner portion 320 thereof for rotation of the outer drum member in a direction indicated by the arrow 332. Therefore, the ductile metal tube 312 rolls on the outer peripheral wall 334 of the outer portion 316 as driven by the outer drum 314 and energy is absorbed for movement in this direction.

However, when a return spring 336 restores the shaft 330 in the opposite direction to the arrow 332, that is, as indicated by the arrow 340 the outer portion 316 of the clutch 317 is allowed to rotate in this direction, with respect to the inner portion 320 and, therefore, the outer drum 314, the ductile metal tubes 312 and the outer portion 316 of the clutch 317 rotate together with the gear 324 and shaft 330, as well as the gear 328 to restore the rack 326 and the energy-absorbing device 310 to its initial condition to allow repetitive applications of energy absorption.

From the above embodiments of applicants' invention it can be seen that applicants have provided an improved energy absorbing device. In some embodiments a ductile metal that is cyclically strained in the plastic deformation region is utilized to absorb energy and is drivingly coupled to a drive means comprising a slip clutch. A means is utilized to drive the slip clutch to drive the energy absorbing device in a first direction and the slip clutch allows the return of the device to its initial condition after each cycle of energy absorption so that the device may again be utilized to absorb energy. The return is provided by means of the slip clutch without expenditure of large amounts of energy or disassembling of the energy absorbing device. Applicants have provided the ductile metal energy absorbing structure in the form of tubes, helix, a beam, a washer-like disc, a tape or wire.

It will be appreciated that the various drive means above-described may be utilized interchangeably in the various embodiments of the energy-absorbing devices according to applicants' invention. For example, the slip clutch and rack drive means could be utilized with any of the embodiments, as could the cable drive or the weighted lever drive.

Thus, those skilled in the art may find many variations and adaptations of applicants' improved energy absorbing arrangement and all such adaptations and variations falling within the true scope and spirit of applicants' invention are intended to be covered by the following claims.

What is claimed as new and desired to be secured by Letters Patent of the United States is:

1. In combination:
   a first body member;
   a second body member positioned with respect to said first body member to allow relative motion therebetween;
   energy absorbing means engaging at least one of said first and said second body members for absorbing energy during said relative motion;
   drive means drivingly engaging one of said first and said second body members for providing said relative motion therebetween for said drive means moving from a first position to a second position, and said drive means free of said relative motion producing engagement for movement from said second position to said first position; and
   return means for returning said drive means from said second to said first position.

2. The arrangement defined in claim 1 wherein said first body member comprises a cylindrical rod-like drum member and said second body member comprises a tube-like drum member concentrically mounted on and surrounding at least a portion of said first body member and spaced a preselected distance therefrom.

3. The arrangement defined in claim 2 wherein:
   said energy absorbing means comprises a plurality of tube members intermediate said first body member and said second body member and said tube members having their axes parallel to the axis of said first body member and said second body member, and said tube members having a predetermined lateral compression thereon from said first body member and said second body member; and
   said relative motion is rotary.

4. The arrangement defined in claim 2 wherein:
   said energy absorbing means comprises a plurality of helix members, each of said helix members having their major axes substantially parallel to the axis of said first body member and said second body member, and said helix members having a predetermined lateral compression thereon from said first body member and said second body member; and
   said relative motion is rotary.

5. The arrangement defined in claim 2 wherein said energy absorbing means comprises the outside surface of said first body member and the inside surface of said second body member.

6. The arrangement defined in claim 1 wherein said drive means comprises:
   a ratchet clutch coupled to said first body member and rotating said first body member with respect to said second body member for rotation of said ratchet clutch in a first direction; and
   a gear means drivingly engaging said ratchet clutch means to rotate said ratchet clutch means in said first direction and said gear means free to rotate in a second direction opposite said first direction free of driving engagement with said first body member; and
   said return means comprises a spring means yieldingly engaging said rack means for yieldingly resisting movement of said rack means from a first position in a first direction to a second position to rotate said gear means, ratchet means and said first body member in said first direction and said spring means returning said rack means from said second position in a second direction opposite said first direction to said first position to rotate said gear means in said second direction.

7. The arrangement defined in claim 1 wherein said first body member comprises:'
   an upper disc-like member and said second body member comprises a lower disc-like member spaced a preselected distance therefrom and said energy absorbing means comprise a plurality of tapered tube members positioned between said upper disc and said lower disc members and said tapered tube members are laterally compressed between said upper disc member and said lower disc member in the plastic deformation region thereof.

8. An energy absorbing arrangement comprising, in combination:
   passage defining means defining a curve reversing passage;
   a ductile metal energy absorbing means positioned within said passage;
   motion producing means drivingly coupled to said ductile metal energy absorbing means for driving said energy absorbing means in said curve reversing passage to cyclically deform said energy absorbing means;
   drive means for driving said ductile metal energy absorbing means in said curve reversing passage in a first direction; and
   return means for providing motion of said drive means in a second direction opposite said first direction and free of driving engagement with said energy absorbing means for movement in said second direction.

9. The arrangement defined in claim 8 wherein said ductile metal energy absorbing means comprises a plurality of washer-like members, and said passage defining means comprises a plurality of spaced-apart spherical rollers.

10. The arrangement defined in claim 8 wherein said ductile metal energy absorbing means comprises a ductile metal cylinder and said passage defining means comprises a tube-like outer drum member and a rod-like inner drum member in spaced-apart relationship thereto, and a first plurality of rollers adapted to roll on the inside surface of said outer drum and a second plurality of rollers adapted to roll on the outer surface of said inner drum, and said ductile metal energy absorbing cylinder positioned between said first plurality of rollers and said second plurality of rollers in a curve-reversing passage defined thereby.

11. The arrangement defined in claim 8 wherein said ductile metal energy absorbing means comprises a flexible band and said passage defining means comprises a pair of fixed jaws in spaced-apart relationship defining a curve-reversing passage therebetween.

12. An energy absorbing arrangement comprising, in combination:
a beam means;
a pair of spaced-apart bearings for supporting said beam means therebetween;
a deflection producing means positioned intermediate said pair of bearings for deflecting said beam means a predetermined distance from an aligned arrangement in said bearings,
a slip clutch drivingly coupled to said beam means to drive said beam means in a first direction and motion producing means drivingly engaging said slip clutch for driving said beam means in said first direction, and return means for returning said motion producing means in a second direction opposite said first direction and said slip clutch free of driving engagement with said beam means for movement in said second direction,
whereby rotation of said ductile metal beam means about the axis thereof in a deflected condition deforms said beam means in the plastic deformation region thereof for cyclic energy absorption.

13. An energy absorbing arrangement comprising, in combination:
an energy absorbing member;
deforming means engaging said energy absorbing member;
a drive means comprising:
a slip clutch in driving engagement with one of said deforming means and said energy absorbing member for driving said energy absorbing member in a first direction and said energy absorbing member cyclically in a hysteritic deformation by said deforming means for movement in said first direction;
motion producing means for driving said slip clutch in said first direction for movement from a first to a second position; and
return means for returning said motion producing means in a second direction opposite said first direction from said second position to said first position and said slip clutch free of driving engagement for movement in said second direction.

14. Arrangement defined in claim 13 wherein said motion producing means comprises a weighted lever.

15. Arrangement defined in claim 13 wherein said motion producing means comprises a chain and sprocket.

16. The arrangement defined in claim 13 wherein said motion producing means comprises a rack means drivingly engaging a rachet-type slip clutch.

17. An energy absorbing arrangement comprising in combination:
a first body member;
a second body member spaced from said first body member and positioned with respect thereto to allow relative rotary motion therebetween;
a plurality of helix members laterally compressed between said first and said second body members, and whereby said relative rotary motion rolls said plurality of helix members about their major axis to provide energy absorbing cyclic plastic deformation thereof.

18. The arrangement defined in claim 17 wherein said first body member comprises a rod-like drum member and said second body member comprises a tube-like drum member concentrically mounted therewith.

19. An energy absorbing arrangement comprising, in combination:
a first disc-like plate member;
a second disc-like plate member spaced a predetermined distance from said first plate member and positioned with respect thereto to allow relative rotary motion therebetween about a predetermined axis;
a plurality of ductile metal tapered tube members spaced in a preselected array about said axis and laterally compressed in the plastic deformation region thereof by said first and second plate members;
whereby said relative rotary motion rolls said tapered tube members to provide energy absorbing cyclic plastic deformation thereof.

References Cited

UNITED STATES PATENTS 3,360,081   12/1967   Platus et al. _________ 188—1

DUANE A. REGER, *Primary Examiner.*

U.S. Cl. X.R.

188—129, 130; 267—1